(12) United States Patent
Suzuki et al.

(10) Patent No.: US 10,343,245 B2
(45) Date of Patent: Jul. 9, 2019

(54) LIQUID DRAINAGE MECHANISM AND MACHINE TOOL EQUIPPED WITH LIQUID DRAINAGE MECHANISM

(71) Applicant: FANUC CORPORATION, Yamanashi (JP)

(72) Inventors: Toyoaki Suzuki, Yamanashi (JP); Hiroshi Minami, Yamanashi (JP); Masahiro Murota, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/786,683

(22) Filed: Oct. 18, 2017

(65) Prior Publication Data

US 2018/0104784 A1  Apr. 19, 2018

(30) Foreign Application Priority Data

Oct. 19, 2016  (JP) .................. 2016-205095

(51) Int. Cl.
| | |
|---|---|
| *B23Q 11/08* | (2006.01) |
| *B23Q 1/48* | (2006.01) |
| *B23Q 11/12* | (2006.01) |
| *B23Q 1/62* | (2006.01) |
| *F16C 29/08* | (2006.01) |

(52) U.S. Cl.
CPC ........ *B23Q 11/0825* (2013.01); *B23Q 1/4857* (2013.01); *B23Q 1/623* (2013.01); *B23Q 11/08* (2013.01); *B23Q 11/121* (2013.01); *B23Q 2011/0808* (2013.01); *F16C 29/08* (2013.01)

(58) Field of Classification Search
CPC .. B23Q 11/0825; B23Q 1/4857; B23Q 1/623; B23Q 11/121; B23Q 2011/0808; F16C 29/08; B66B 7/1269
See application file for complete search history.

(56) References Cited

U.S. PATENT DOCUMENTS

| | | | | |
|---|---|---|---|---|
| 884,957 | A * | 4/1908 | Rush ..................... | B66B 7/1269 184/21 |
| 990,892 | A * | 5/1911 | Macindoe ............. | B66B 7/1269 184/21 |
| 1,007,422 | A * | 10/1911 | Berger .................. | B66B 7/1269 184/21 |

(Continued)

FOREIGN PATENT DOCUMENTS

| | | |
|---|---|---|
| CN | 102266951 A | 12/2011 |
| CN | 202591627 U | 12/2012 |

(Continued)

*Primary Examiner* — Michael A Riegelman
(74) *Attorney, Agent, or Firm* — Hauptman Ham, LLP

(57) ABSTRACT

A liquid drainage mechanism drains oil (liquid) from a Y-axis slider that moves along a predetermined path. The liquid drainage mechanism includes an outflow hole and a nozzle flow passage that are provided in a C-axis rotary mechanism and configured to flow the oil in a stator, a nozzle configured to move integrally with the Y-axis slider and discharge the oil, and a Y-axis guide member configured to guide the Y-axis slider. The nozzle is disposed at a position that is close to but not in contact with the Y-axis guide member, and the nozzle discharges the oil so that the oil reaches the Y-axis guide member.

7 Claims, 5 Drawing Sheets

(56) References Cited

U.S. PATENT DOCUMENTS

| | | | | |
|---|---|---|---|---|
| 1,045,977 | A | * | 12/1912 | Hirz .................... B66B 7/1269 184/22 |
| 1,181,538 | A | * | 5/1916 | Osterberg ............ B66B 7/1269 184/22 |
| 1,603,892 | A | * | 10/1926 | Bassett ................ B66B 7/1269 184/22 |
| 1,643,038 | A | * | 9/1927 | Weigele ............... B66B 7/1269 184/22 |
| 1,805,305 | A | * | 5/1931 | Brady .................. B66B 7/1269 184/102 |
| 1,940,360 | A | * | 12/1933 | Macy ................... B66B 7/1269 184/21 |
| 1,990,777 | A | * | 2/1935 | Doane .................. B66B 7/1269 184/21 |
| 2,102,814 | A | * | 12/1937 | Walsh .................. B66B 7/1269 184/21 |
| 2,539,769 | A | * | 1/1951 | Berthiez ............ B23Q 11/0875 384/15 |
| 3,903,993 | A | * | 9/1975 | Vorrhees .............. B30B 15/041 184/100 |
| 4,753,044 | A | * | 6/1988 | Bula ..................... B23Q 7/047 451/21 |
| 6,098,756 | A | * | 8/2000 | Shigetomi ............ B66B 7/1269 184/21 |
| 9,890,018 | B2 | * | 2/2018 | Lehikoinen ............ F16N 31/02 |
| 2013/0136384 | A1 | | 5/2013 | Tsai |
| 2014/0083244 | A1 | | 3/2014 | Segawa |
| 2016/0115994 | A1 | * | 4/2016 | Tada ..................... F16C 29/025 384/12 |
| 2016/0229018 | A1 | * | 8/2016 | Tada ........................ B23Q 1/26 |
| 2017/0106486 | A1 | * | 4/2017 | Chen ........................ B23Q 1/56 |
| 2018/0104784 | A1 | * | 4/2018 | Suzuki .................. B23Q 1/623 |

FOREIGN PATENT DOCUMENTS

| | | |
|---|---|---|
| CN | 203357141 U | 12/2013 |
| CN | 204053130 U | 12/2014 |
| CN | 104428545 A | 3/2015 |
| JP | 62-218047 A | 9/1987 |
| JP | 63-189554 U | 12/1988 |
| JP | 2014-65083 A | 4/2014 |
| JP | 2016-2622 A | 1/2016 |

* cited by examiner

LIQUID DRAINAGE MECHANISM AND MACHINE TOOL EQUIPPED WITH LIQUID DRAINAGE MECHANISM

CROSS-REFERENCE TO RELATED APPLICATION

This application is based upon and claims the benefit of priority from Japanese Patent Application No. 2016-205095 filed on Oct. 19, 2016, the contents of which are incorporated herein by reference.

BACKGROUND OF THE INVENTION

Field of the Invention:
The present invention relates to a liquid drainage mechanism for draining liquid from a moving member that moves along a predetermined path as well as to a machine tool equipped with a liquid drainage mechanism.

Description of the Related Art:
In machine tools, a fluid is supplied between a moving member and a guide member that form an axis, so as to form a static pressure bearing, thereby improving the slidability of the moving member to the guide member. In particular, use of oil (liquid) as the fluid enhances the rigidity of the bearing and improves vibration damping performance when the moving member moves.

Here, if the liquid drainage mechanism of the machine tool is configured to drop used oil directly from the bearing, the oil scatters and soils the machine tool and unintended surrounding parts. To deal with such a situation, for example, Japanese Laid-Open Patent Publication No. 62-218047 discloses a configuration of a lubrication oil collecting device in which an oil pan is attached to the lower end of a vertically movable cross rail (moving member). That is, this oil pan collects the oil that has been used as a lubricant, while moving together with the moving member.

SUMMARY OF THE INVENTION

However, in the configuration in which the oil pan is integrated with the moving member as disclosed in Japanese Laid-Open Patent Publication No. 62-218047, when a certain amount of oil builds up in the oil pan, the moving member has to be moved down so as to discharge the oil therefrom. Therefore, this configuration lowers the working efficiency of the machine tool. Alternatively, the oil might be drained through a hose which is attached to the oil pan. However, in this case, the moving member is subjected to resistance (deformation, etc.,) of the hose, and thus there is a risk that movement control of the moving member is affected.

The present invention has been devised in view of the above circumstances, it is therefore an object of the present invention to provide a liquid drainage mechanism which, with a simple structure, enables easy drainage of liquid for a moving member while suppressing scatter of the liquid and facilitates control of the moving member, as well as to provide a machine tool equipped with the liquid drainage mechanism.

In order to achieve the above object, according to an aspect of the present invention, there is provided a liquid drainage mechanism for draining liquid from a moving member that moves along a predetermined path, including: a flow passage provided in the moving member and configured to flow the liquid of the moving member; an ejector configured to move integrally with the moving member and eject the liquid flowing through the flow passage; and a fixed member provided in the periphery of the moving member so as to extend parallel to the predetermined path, wherein the ejector is disposed at a position that is close to but not in contact with the fixed member, the ejector being configured to discharge the liquid so that the liquid reaches the fixed member.

According to the above configuration, since the liquid drainage mechanism discharges the liquid from the ejector so that the liquid can reach the fixed member, it is possible to eject the liquid while suppressing scattering of the liquid. That is, since the ejector and the fixed member are located close to each other, the discharged liquid is poured onto (or reaches) the fixed member before scattering of the liquid, and this liquid flows down along the fixed member. As a result, the liquid does not fall freely from the moving member, and it is hence possible to prevent the liquid from scattering and soiling the machine tool and the unintended components around the machine tool. Further, when the moving member moves, the ejector is kept out of contact with the moving member, and thud the movement of the moving member is not subjected to any resistance or other adverse influence. Accordingly, the liquid drainage mechanism makes it possible to easily and precisely control movement of the moving member.

In this case, it is preferable that the moving member is configured to reciprocate in the vertical direction as the predetermined path, and a distance of a gap between the ejector and the fixed member is kept constant when the moving member is positioned at different heights.

In the liquid drainage mechanism, since the distance of the gap between the ejector and the fixed member is kept constant when the moving member is positioned at different heights, it is possible to stably apply the liquid from the ejector onto the fixed member.

In addition to the above configurations, the moving member may include a rotary mechanism having a rotor and a stator configured to rotatably support the rotor, and the liquid may be oil that is supplied between the rotor and the stator to thereby form a static pressure bearing.

The static pressure bearing of the rotary mechanism can improve the damping performance of the rotor by oil. Further, by discharging the oil used in the static pressure bearing, the liquid drainage mechanism makes it possible to favorably prevent the oil from dropping from the rotary mechanism.

It is preferable that the flow passage is configured to communicate with a recessed portion formed under a housing space of the stator in which the rotor is accommodated, and the oil flows through the flow passage to the ejector.

Since the oil used in the static pressure bearing accumulates in a lower portion of the housing space of the stator, it is possible to reliably discharge the oil from the housing space of the stator through the flow passage that communicates with the recessed portion.

Further, it is preferable that the fixed member has a groove facing an outlet of the ejector and extending in a direction in which the fixed member extends, the liquid being discharged from the ejector through the outlet.

In the liquid drainage mechanism, owing to the groove extending in the direction in which the fixed member extends, it is possible for the liquid discharged from the outlet of the ejector to flow along the groove, thereby draining the liquid favorably.

Here, the fixed member is preferably a guide member configured to guide movement of the moving member.

Since the ejector provided on the moving member ejects the liquid to the guide member that guides the moving member, it is possible to easily drain the liquid. In addition, since it is not necessary to separately provide a member for draining the liquid, installation cost of the liquid drainage mechanism can be reduced.

Alternatively, the fixed member may be a drainage guide member arranged in the periphery of the moving member so as to extend in parallel with the predetermined path.

The drainage guide member allows the liquid discharged from the ejector to flow through a desired path, and can facilitate reuse of the liquid and other purposes.

In order to achieve the above object, according to another aspect of the present invention, there is provided a machine tool including: a moving member configured to move along a predetermined path; and a liquid drainage mechanism configured to drain liquid from the moving member, wherein: the liquid drainage mechanism includes: a flow passage provided in the moving member and configured to flow the liquid of the moving member; an ejector configured to move integrally with the moving member and eject the liquid flowing through the flow passage; and, a fixed member provided in the periphery of the moving member so as to extend parallel to the predetermined path, and the ejector is disposed at a position that is close to but not in contact with the fixed member, the ejector being configured to discharge the liquid so that the liquid reaches the fixed member.

According to the present invention, in the liquid drainage mechanism as well as the machine tool provided with the liquid drainage mechanism, it is possible to drain liquid while suppressing scattering of the liquid of the moving member with a simple configuration, and simplify control of the moving member.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A liquid drainage mechanism and a machine tool with the liquid drainage mechanism according to the present invention will be detailed by describing a preferred embodiment with reference to the accompanying drawings.

Figure 1:
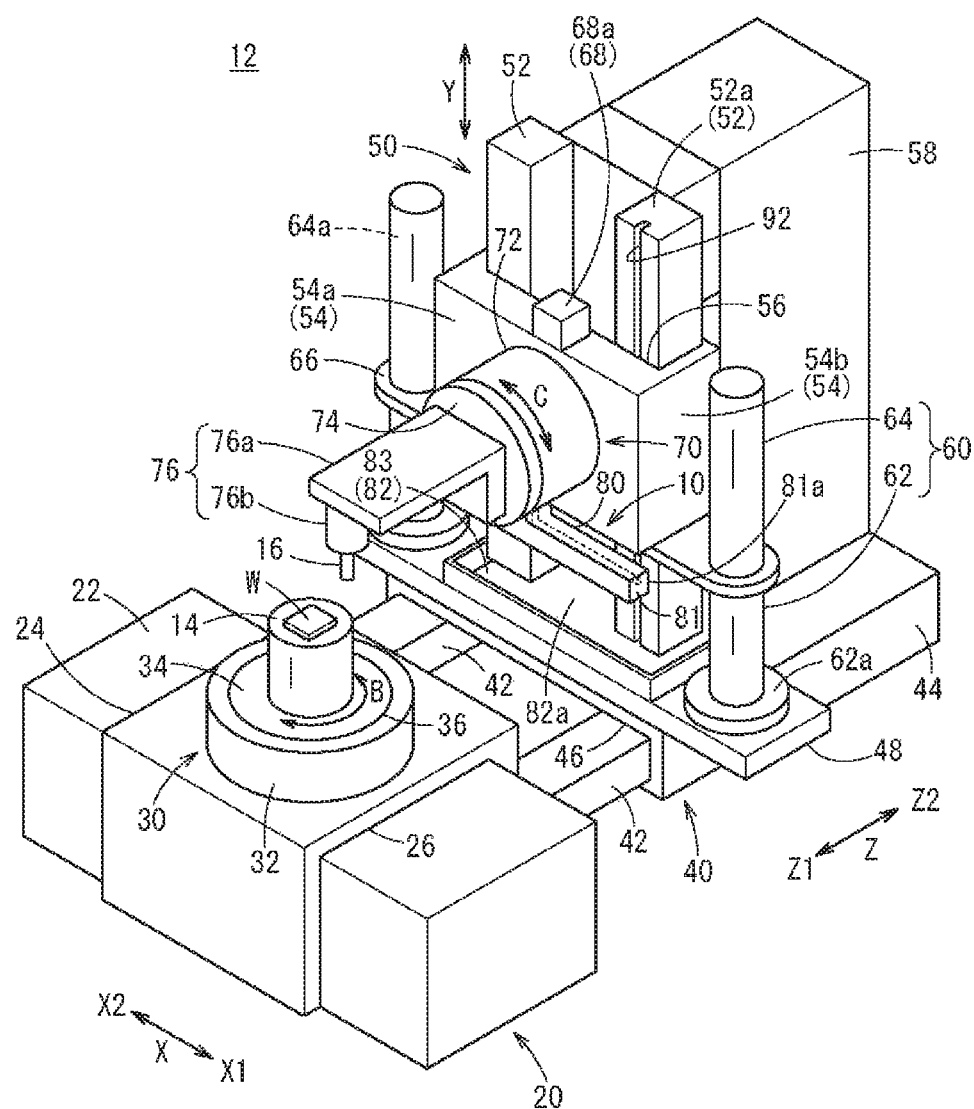
FIG. 1 is a perspective view schematically showing a machine tool having a liquid drainage mechanism according to an embodiment of the present invention.

As shown in FIG. 1, a liquid drainage mechanism 10 according to one embodiment of the present invention is configured as a structural part provided on a static pressure bearing of a machine tool 12 in order to drain oil (liquid: lubricant) used as a fluid. In particular, the liquid drainage mechanism 10 according to the present embodiment is provided on a moving member (a Y-axis slider 54 to be described later) that moves in the vertical direction, and suppresses scattering of the oil by preventing the oil from falling freely from the moving member. In addition, the liquid drainage mechanism 10 is installed so as not to affect movement control of the moving member, whereby it is possible to stabilize the behavior of the moving member during movement thereof.

Hereinbelow, for easy understanding of the liquid drainage mechanism 10 according to the present embodiment, the machine tool 12 equipped with the liquid drainage mechanism 10 will be described first.

In order to machine a workpiece W, the machine tool 12 is configured to perform 5-axis machining under the control of an unillustrated numerical controller. More specifically, the machine tool 12 is configured to reciprocate a table 14 with the workpiece W placed thereon in the X-axis direction and rotate the table 14 about a B-axis. Further, the machine tool 12 is configured to reciprocate a tool 16 for machining the workpiece W in the Z-axis direction (the direction toward and away from the table 14) and the Y-axis direction (vertical direction) and enable indexing of the tool 16 about a C-axis (positioning the posture of the tool 16).

That is, in addition to the three feed axes, the machine tool 12 according to the present embodiment has one rotating axis in the table 14 and one rotating axis of the spindle. Here, the machine tool 12 to which the liquid drainage mechanism 10 is applied should not be particularly limited by the number of axes. Further, the installed condition of the rotating axes also should not be limited. For example, the liquid drainage mechanism 10 can be applied to a machine having two rotating axes on the table 14 side or a machine having two rotating axes on the tool 16 side.

The X-axis feed mechanism 20 of the machine tool 12 is composed of an X-axis guide member 22, an X-axis slider 24 capable of reciprocating on the X-axis guide member 22, and a static pressure bearing 26 for the feed axis provided between the X-axis guide member 22 and the X-axis slider 24. The feed axis static pressure bearing 26 is supplied with oil at a predetermined oil pressure from an unillustrated oil supply mechanism to thereby form an oil film between the X-axis guide member 22 and the X-axis slider 24. Thereby, vibration generated when the X-axis slider 24 moves is attenuated so that the X-axis slider 24 can slide smoothly.

A rotary mechanism 30 for the B-axis of the machine tool 12 is composed of a stator 32 fixed to the top of the X-axis slider 24, and a rotor 34 arranged inside the stator 32 to be rotatable relative to the stator 32, and further includes a static pressure bearing 36 for the rotary shaft between the stator 32 and the rotor 34. This static pressure rotary shaft bearing 36 can employ a mechanism in which air is supplied as a fluid between the stator 32 and the rotor 34 to form an air film. Alternatively, the same mechanism (for supplying oil as a fluid) as that provided in a C-axis rotary mechanism 70 described later may be adopted. The table 14 for fixing and holding the workpiece W is arranged on the upper surface of the rotor 34, so that the workpiece W is positioned and fixed on the top of the table 14.

The Z-axis feed mechanism 40 of the machine tool 12 is composed of a pair of Z-axis guide members 42 and a Z-axis slider 44 capable of reciprocating the pair of Z-axis guide members 42. Provided between each of the Z-axis guide members 42 and the Z-axis slider 44 is a feed axis static pressure bearing 46 having the same structure as that of the X-axis feed mechanism 20. A Y-axis feed mechanism 50 is provided on the top of the Z-axis slider 44, and an oil pan 82 that constitutes part of the liquid drainage mechanism 10 is also provided thereon.

The Y-axis feed mechanism 50 includes a pair of Y-axis guide members 52, and a Y-axis slider 54 (moving member) capable of reciprocating along the paired Y-axis guide members 52. Provided between each of the Y-axis guide members 52 and the Y-axis slider 54 is a feed axis static pressure bearing 56 having a structure similar to those of the feed axis static pressure bearings 26 and 46 of the X-axis and Z-axis feed mechanisms 20 and 40. Further, the Y-axis feed mechanism 50 includes a support body 58 fixed upright on the top of the Z-axis slider 44, and an air balance mechanical unit 60 for assisting upward/downward movement of the Y-axis slider 54.

The paired Y-axis guide members 52 extend in parallel to the Y-axis slider 54's direction of movement (predetermined path), and guide the movement of the Y-axis slider 54. Each of the Y-axis guide members 52 has a rectangular tubular shape of a predetermined length and is installed so as to extend vertically at a position apart from the other. Each of the Y-axis guide members 52 is fixed to a bottom surface 82a forming a reservoir space 83 of the oil pan 82. Of the four sides of each of Y-axis guide members 52, side surfaces other than a side surface that faces another Y-axis guide member form sliding surfaces (one of the bearing surfaces of the feed axis static pressure bearing 56) on which the Y-axis slider 54 slides. The oil supplied to the feed axis static pressure bearing 56 adheres to these sliding surfaces and flows downward.

Further, the paired Y-axis guide members 52 are fixed to the support body 58 located on the Z2 side in FIG. 1 (see also FIG. 2), whereby their vertical posture is maintained. Thought the support body 58 shown in FIG. 1 has a rectangular parallelepiped block form, in order to reduce the weight applied on the Z-axis slider 44, the support body 58 may be formed in a framed structure having a hollow space.

One (the right one in FIG. 1) of the paired Y-axis guide members 52 is a fixed member that is part of the liquid drainage mechanism 10. Hereinafter, this Y-axis guide member 52 is also referred to as a drainage Y-axis guide member 52a. The specific functions of the drainage Y-axis guide member 52a will be described later.

The Y-axis slider 54 is composed of a fixing wall portion 54a to which the C-axis rotary mechanism 70 is fixed, and a pair of guide wall portions 54b disposed on both sides of the fixing wall portion 54a. The Y-axis slider 54 is formed as a single piece by integral molding. The fixing wall portion 54a has a flat surface and is thick enough to provide rigidity so as to retain the C-axis rotary mechanism 70. The paired guide wall portions 54b cover respective Y-axis guide members 52 in a hooking manner so as to slide the Y-axis slider 54 in the vertical direction while suppressing backlash or wobbling in the X-direction and the Z direction. That is, the inner surface constituted by the fixing wall portion 54a and the paired guide wall portions 54b defines the other bearing surface of the feed axis static pressure bearing 56 facing the sliding surface of each Y-axis guide member 52.

Further, the Y-axis slider 54 is assisted to move vertically by the air balance mechanical unit 60 fixed on an extension plate 48 on the Z-axis slider 44. The air balance mechanical unit 60 includes a pair of fixed shafts 62 provided on the upper surface at both sides of the extension plate 48, and a pair of movable cylinders 64 externally fitted on the respective fixed shafts 62 so as to be movable relative thereto.

The paired fixed shafts 62 each have a cylindrical shape extending a predetermined length upward from an attachment plate 62a provided at a lower end thereof and which is fixed to the extension plate 48. The paired movable cylinders 64 each have an inner hollow space 64a having a diameter slightly greater than the outer diameter of the fixed shaft 62, and the fixed shafts 62 are covered with the movable cylinders 64. A bridge frame 66 extends from the lower end of each of the paired movable cylinders 64 toward each side of the Y-axis slider 54, and is connected to the Y-axis slider 54.

In the air balance mechanical unit 60 thus configured, working air is supplied to or discharged from the inner hollow spaces 64a of the paired movable cylinders 64 at proper timing by an unillustrated working air supply mechanism. Thereby, the movable cylinders 64 are moved relative to the fixed shafts 62. That is, when the Y-axis slider 54 is moved in the vertical direction, the air balance mechanical unit 60 controls driving of the Y-axis feed mechanism 50, and as a result of the control of driving, the load of the Y-axis slider 54 (including the C-axis rotary mechanism 70, the spindle mechanism 76, the tool 16, etc.) is distributed, and received by the air balance mechanical unit 60. As a result, the Y-axis slider 54 can move up and down smoothly.

Further, the Y-axis slider 54 includes an oil supply mechanism 68 at an upper part thereof in order to supply oil to the Y-axis feed mechanism 50 and the C-axis rotary mechanism 70. The oil supply mechanism 68 includes an oil tank 68a for storing oil, and a feed axis flow passage 68b provided inside the Y-axis slider 54 to feed oil to the feed axis static pressure bearing 56. A pump (not shown) is provided at an oil supply port of the oil tank 68a, and driven to let the oil out from the oil tank 68a. It is noted that the oil supply mechanism 68 may be arranged at another position in the machine tool 12, and, for example, the mechanism 68 may be attached to the support body 58 or the like in order to supply oil to the flow passage of the Y-axis slider 54 via an unillustrated tube.

The C-axis rotary mechanism 70 is composed of a stator 72 fixed to the Y-axis slider 54, and a rotor 74 rotatable relative to the stator 72. The rotor 74 is partly housed inside the stator 72, and is exposed on a side remote from the Y-axis slider 54 (Z1 side in FIG. 1). A spindle mechanism 76 for driving the tool 16 to machine the workpiece W is attached to a front side (the Z1 side in FIG. 1) of the rotor 74.

The spindle mechanism 76 is not particularly limited, but may perform sawing, trimming, cutting and other machining. For example, the spindle mechanism 76 includes an L-shaped support 76a in side view and a spindle 76b that holds a tool 16 on an extended side of the support 76a and rotates the tool 16 about an axis. That is, the moving member according to the present embodiment is an assembly including the Y-axis slider 54, the C-axis rotary mechanism 70, the spindle mechanism 76, and the tool 16.

Figure 2:
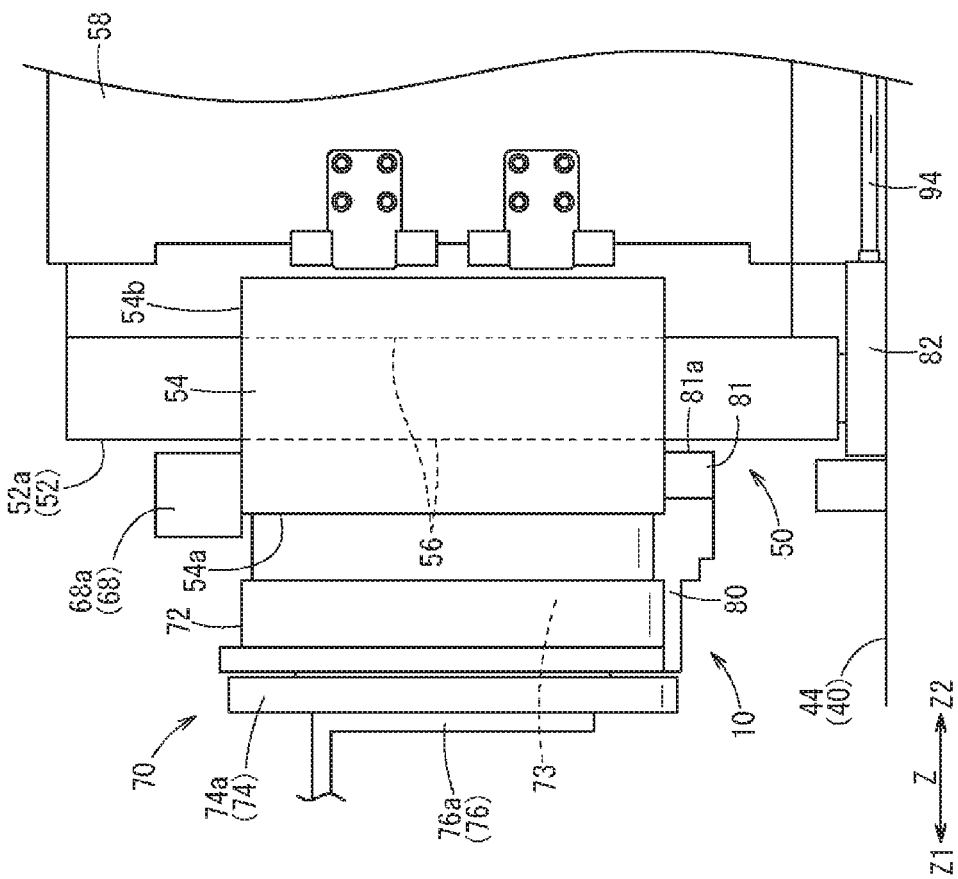
FIG. 2 is a side view showing a Y-axis feed mechanism and a C-axis rotary mechanism of a machine tool equipped with a liquid drainage mechanism of the present invention.
Figure 3:
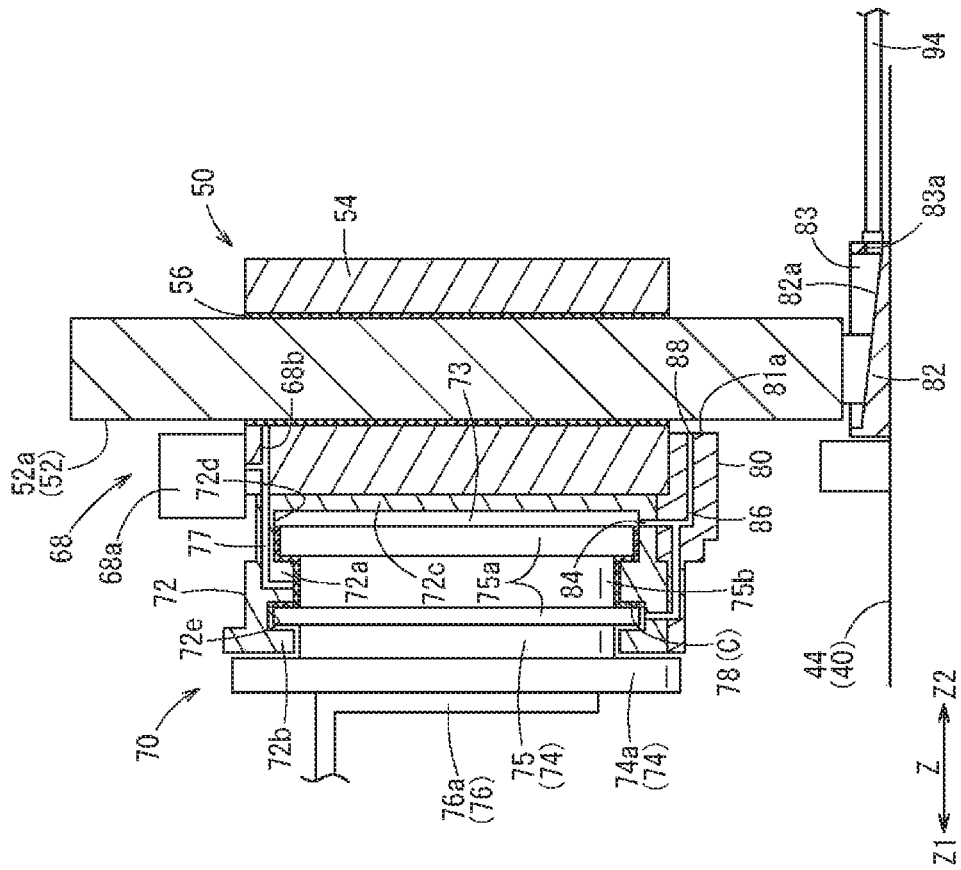
FIG. 3 is a side cross sectional view of the Y-axis feed mechanism and the C-axis rotary mechanism of FIG. 2.

As shown in FIGS. 2 and 3, the stator 72 as a part of the C-axis rotary mechanism 70 is formed in a substantially cylindrical shape, and has a housing space 73 for housing the rotor 74. On the inner peripheral surface defining the housing space 73 of the stator 72, a first inner projection 72a projecting annularly is formed in the circumferential direction. Further, a second inner projection 72b that protrudes radially inward is formed on the inner periphery in the front part of the stator 72 so as to prevent oil from leaking out to the front side (the Z1 side in FIG. 1) of the rotor 74.

That is, on the inner peripheral surface of the stator 72, a first groove 72d (recessed portion) is formed between a bottom wall 72*c* to be attached to the Y-axis slider 54 and the first inner projection 72*a*, and a second groove 72*e* (recessed portion) is formed between the first inner projection 72*a* and the second inner projection 72*b*.

On the other hand, the rotor 74 has a cylindrical portion 75 mounted in the housing space 73 of the stator 72, and a disc portion 74*a* connected to the front side of the cylindrical portion 75 and exposed from the stator 72. Two annular projections 75*a* are formed on the outer peripheral surface of the cylindrical portion 75. The two annular projections 75*a* are housed in the first and second grooves 72*d* and 72*e* of the stator 72, so that the rotor 74 cannot be detached from the stator 72. The rotor 74 is rotated about the axial center (C-axis) by a motor (for example, a mechanism composed of coils and magnets: not shown) incorporated in a hole formed in the center.

In the C-axis rotary mechanism 70, a clearance C formed between the first inner projection 72*a* of the stator 72 and the two annular projections 75*a* and facing surface 75*b* of the rotor 74 forms a static pressure rotary shaft bearing 78. Further, the machine tool 12 utilizes the above-mentioned oil supply mechanism 68 in order to supply oil to the static pressure rotary shaft bearing 78.

Specifically, a rotary shaft flow passage 77 is formed inside the Y-axis slider 54 and inside the stator 72 so as to communicate with the oil tank 68*a* of the above-described oil supply mechanism 68. For example, one end of the rotary shaft flow passage 77 opens on the protruding surface of the first inner projection 72*a* of the stator 72, and communicates with the clearance C formed by the facing surface 75*b*. As a result, oil is supplied from the oil tank 68*a* to the static pressure rotary shaft bearing 78 via the rotary shaft flow passage 77. Here, the mechanism for supplying oil to the static pressure rotary shaft bearing 78 may be provided separately from the oil supply mechanism 68 for supplying oil to the feed axis static pressure bearing 56.

Oil is supplied to the housing space 73 of the stator 72 via the rotary shaft flow passage 77, whereby an oil film is formed in the clearance C of the static pressure rotary shaft bearing 78, and the rotor 74 can rotate smoothly. In order to drain the oil of the static pressure rotary shaft bearing 78, the machine tool 12 is provided with the liquid drainage mechanism 10.

The liquid drainage mechanism 10 includes part of the C-axis rotary mechanism 70 (stator 72), a nozzle 80 (ejector) attached to an outer peripheral surface of the stator 72, a drainage Y-axis guide member 52*a*, and the oil pan 82.

Figure 4A:
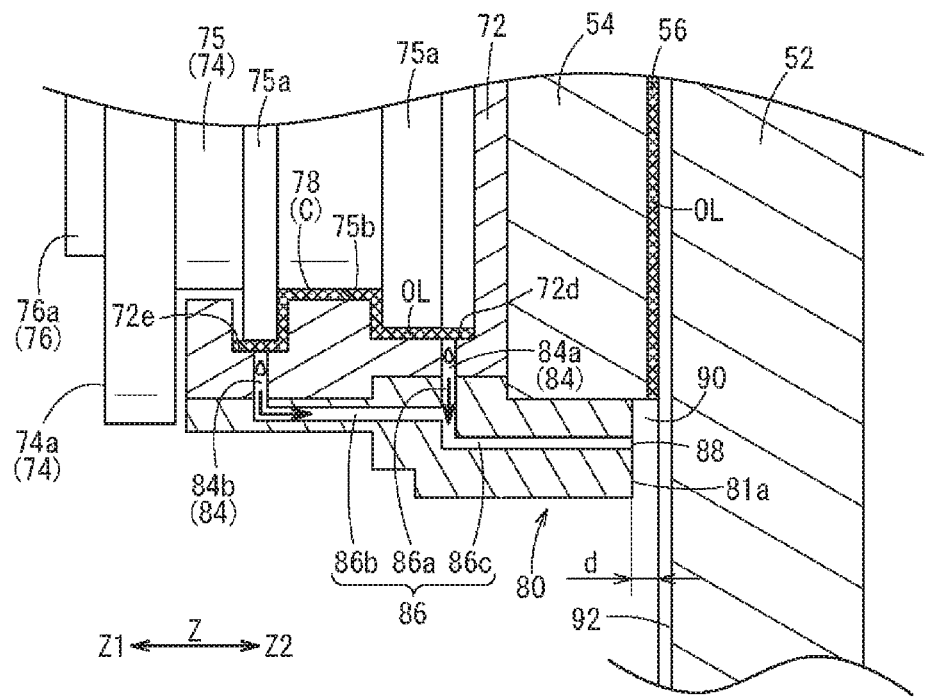
FIG. 4A is a partially enlarged sectional view showing the liquid drainage mechanism of FIG. 3.

As shown in FIG. 4A, the liquid drainage mechanism 10 has a plurality of outflow holes 84 (flow passages) under the stator 72 to allow the oil to flow out from the housing space 73 to the outside. A first outflow hole 84*a* is formed to penetrate vertically downward from the first groove 72*d* of the stator 72 to the outer peripheral surface. A second outflow hole 84*b* is formed to penetrate vertically downward from the second groove 72*e* of the stator 72 to the outer peripheral surface. That is, the oil of the static pressure rotary shaft bearing 78 forms an oil film, and then flows into the first and second grooves 72*d*, 72*e*, which are lower in level than the first inner projection 72*a*. Owing to the first and second outflow holes 84*a*, 84*b*, the oil can be easily discharged from the housing space 73. It is noted that one or more outflow holes 84 may be provided.

On the other hand, the nozzle 80 of the liquid drainage mechanism 10 is provided in a rectangular tubular form. The nozzle 80 is fixed to a lower position of the stator 72 so as to cover the first and second outflow holes 84*a* and 84*b*. Further, the nozzle 80 extends from the fixed portion of the stator 72 toward the Y-axis slider 54 (Z2 side), bends to the X1 side below the Y-axis slider 54 as shown in FIG. 1, and further extends to the drainage Y-axis guide member 52*a* side (the X1 side in FIG. 1). A side surface on the Z2 side of an extended end portion 81 of the nozzle 80 (which will be hereinbelow referred to as a nozzle end side surface 81*a*) faces the drainage Y-axis guide member 52*a*. In the present embodiment, the stator 72 and the nozzle 80 are formed separately, but these components may be integrally formed.

As shown in FIGS. 1 and 4A, a nozzle flow passage 86 (flow passage) for flowing oil is formed inside the nozzle 80 from the fixed portion of the stator 72 to the extended end portion 81. The nozzle flow passage 86 is composed of a first flow passage 86*a* communicating with the first outflow hole 84*a*, a second flow passage 86*b* communicating with the second outflow hole 84*b*, and a third flow passage 86*c* communicating with an ejection port 88 provided on the nozzle end side surface 81*a*. The first to third flow passages 86*a* to 86*c* join together in the nozzle 80. The oil flowing out from the first and second outflow holes 84*a*, 84*b* is received by the first and second flow passages 86*a*, 86*b* and flows into the third flow passage 86*c*. Then, the third flow passage 86*c* flow the oil along the extended shape of the nozzle 80, and discharges the oil from the ejection port 88 (outlet) on the nozzle end side surface 81*a*. It should be noted that the nozzle flow passage 86 may be inclined downward toward the ejection port 88.

Here, a gap 90 is provided between the nozzle end side surface 81*a* (ejection port 88) of the nozzle 80 and a side surface (a side surface on the Z1 side) of the drainage Y-axis guide member 52*a* that faces the nozzle end side surface 81*a*. The distanced of the gap 90 may and should be set to be such a distance that the oil ejected from the ejection port 88 can reach the side surface on the Z1 side, for example, about 0.5 mm to 3 mm. In the present embodiment, the distance d is set at 1 mm. This gap 90 allows the nozzle 80 to vertically move integrally with the Y-axis slider 54 while keeping out of contact with the drainage Y-axis guide member 52*a*. Further, the oil discharged from the ejection port 88 can be reliably poured onto the drainage Y-axis guide member 52*a* located nearby.

In addition, the ejection port 88 is provided at a position facing a flow groove 92 (groove) of the drainage Y-axis guide member 52*a*. The flow groove 92 formed in the drainage Y-axis guide member 52*a* extends vertically on the sliding surface (the side surface on the Z1 side in FIG. 1) of the Y-axis guide member 52 facing the C-axis rotary mechanism 70, and forms a path for flowing oil downward. The oil discharged from the ejection port 88 readily enters the flow groove 92 without touching the sliding surface of the drainage Y-axis guide member 52*a*. As a result, when oil is poured onto the drainage Y-axis guide member 52*a*, the oil is prevented from scattering in all directions.

Since the oil discharged from the nozzle 80 is steadily poured to the same place in the flow groove 92, it is possible to easily secure a flow rate at which the oil easily flows down. Here, the flow groove 92 may be formed relatively shallow (for example, with a depth shorter than the distanced). Further, the flow groove 92 may be provided in each of the paired Y-axis guide members 52. Furthermore, in the Y-axis guide member 52, the oil may be flowed along the sliding surface, without having any flow groove 92.

As shown in FIGS. 1 and 3, the oil pan 82 of the liquid drainage mechanism 10 is provided under the Y-axis guide member 52. The oil pan 82 is formed in an open top box shape having a reservoir space 83 capable of temporarily storing oil that has flowed down along the flow groove 92.

The oil pan 82 has a discharge port 83a for discharging the oil in the reservoir space 83 to the outside, and a tube 94 of an oil collecting mechanism (not shown) is connected to the discharge port 83a. A bottom surface 82a of the oil pan 82 is preferably inclined downward toward the discharge port 83a, whereby oil can be positively flowed to the discharge port 83a. Further, for example, it is preferable that the oil collecting mechanism is configured to recover and return the collected oil to the oil supply mechanism 68.

The liquid drainage mechanism 10 according to the present embodiment, and the machine tool 12 equipped with the liquid drainage mechanism 10 are basically configured as described above. Now, the operation and effect will be described below.

In machining the workpiece W, under the control of the numerical controller, the machine tool 12 moves the Y-axis slider 54 in the vertical direction and turns the rotor 74 of the C-axis rotary mechanism 70 to thereby position the spindle mechanism 76 (tool 16). When the Y-axis slider 54 is vertically moved, oil OL is supplied from the oil supply mechanism 68 to the feed axis static pressure bearing 56 via the feed axis flow passage 68b of the Y-axis slider 54. The distance d of the gap 90 between the nozzle 80 of the liquid drainage mechanism 10 and the drainage Y-axis guide member 52a is kept constant to thereby ensure smooth movement of the Y-axis slider 54.

When the C-axis rotary mechanism 70 is driven, the oil OL is also supplied to the static pressure rotary shaft bearing 78 by the oil supply mechanism 68. The oil OL is supplied from the oil tank 68a to the housing space 73 via the rotary shaft flow passage 77 to form an oil film in the clearance C between the stator 72 and the rotor 74.

Therefore, as shown in FIG. 4A, the oil OL supplied to the static pressure rotary shaft bearing 78 accumulates in the lower part of the housing space 73 of the stator 72. This oil OL flows into the first and second grooves 72d, 72e and flows out from the first and second outflow holes 84a, 84b provided as part of the liquid drainage mechanism 10 at the lower portion of the stator 72. Further, the oil OL flows downward through the first and second outflow holes 84a, 84b, and then flows into the nozzle flow passage 86 of the nozzle 80.

Figure 4B:
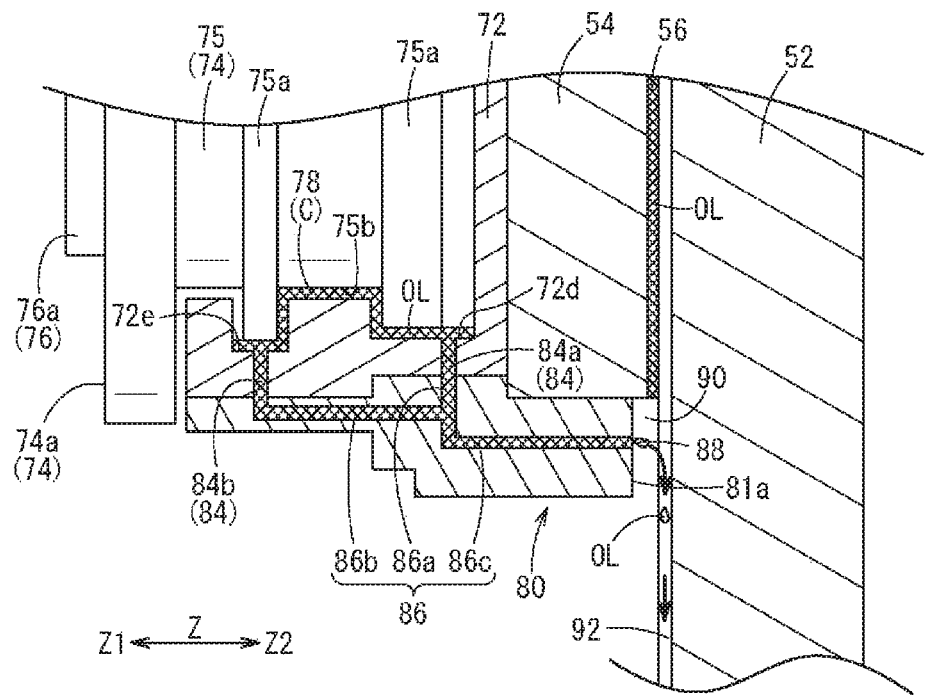
FIG. 4B is a partially enlarged sectional view showing operation in which a liquid drainage mechanism discharges oil; and, FIG. 5 is an illustrative view schematically showing a liquid drainage mechanism according to a modification example.

Inside the nozzle 80, the oil OL flows through the first and second flow passages 86a, 86b, merges at the third flow passage 86c, and further flows through the third flow passage 86c to the extended end portion 81 of the nozzle 80. Then, as shown in FIG. 4B, the oil OL having passed through the third flow passage 86c is discharged from the ejection port 88 on the nozzle end side surface 81a toward the drainage Y-axis guide member 52a.

As described above, since the nozzle end side surface 81a and the side surface of the drainage Y-axis guide member 52a are spaced by the small gap 90 only, the oil OL ejected from the ejection port 88 does not directly drop from the nozzle 80 but is poured onto (reaches) the side surface of the drainage Y-axis guide member 52a. Further, since the ejection port 88 is arranged so as to discharge the oil OL to the flow groove 92 of the drainage Y-axis guide member 52a, the oil OL flows downward along the flow groove 92. Furthermore, since the oil OL used in the feed axis static pressure bearing 56 flows on the surface of the drainage Y-axis guide member 52a, the oil OL discharged from the ejection port 88 merges therewith, and flows down together.

That is, the liquid drainage mechanism 10 prevents the oil OL from falling freely from the C-axis rotary mechanism 70. As a result, it is possible to favorably prevent the oil OL from scattering and soiling the machine tool 12 and its vicinity. The oil OL having flowed through the flow groove 92 is stored in the reservoir space 83 of the oil pan 82 and thereafter collected in the oil collecting mechanism via the discharge port 83a.

As described above, the liquid drainage mechanism 10 and the machine tool 12 according to the present embodiment discharge the oil OL from the nozzle 80 so that the oil can be poured onto (or can reach) the drainage Y-axis guide member 52a, whereby it is possible to drain oil while suppressing scattering of the oil OL. That is, since the nozzle 80 and the Y-axis guide member 52 are located close to each other, the ejected oil OL is poured onto or reaches the Y-axis guide member 52 before scattering of the oil, and the oil OL flows down along the Y-axis guide member 52. As a result, the oil OL does not fall down freely from the Y-axis slider 54, and it is hence possible to prevent the oil OL from scattering and polluting the machine tool 12 and unintended components around the machine tool. Further, when the Y-axis slider 54 moves, the nozzle 80 is kept out of contact with the Y-axis guide member 52, and thus the movement of the Y-axis slider 54 is not subjected to any resistance or other adverse influence. Thus the machine tool 12 can easily and precisely control the movement of the Y-axis slider 54.

In this case, in the liquid drainage mechanism 10, the distance d of the gap 90 between the nozzle 80 and the drainage Y-axis guide member 52a is kept constant when the Y-axis slider 54 is positioned at different heights. With this configuration, it is possible to stably pour the oil OL from the nozzle 80 onto the drainage Y-axis guide member 52a. Further, since the liquid drainage mechanism 10 drains the oil OL used by the static pressure rotary shaft bearing 78, it is possible to suitably prevent the oil OL from dropping from the C-axis rotary mechanism 70. Furthermore, in the liquid drainage mechanism 10, the first and second outflow holes 84a, 84b communicate with the first and second grooves 72d, 72e, and thus it is possible to reliably discharge the oil OL from the housing space 73 of the stator 72.

In the liquid drainage mechanism 10, the oil OL discharged from the ejection port 88 of the nozzle 80 can be made to flow along the flow groove 92 that extends in a direction in which the drainage Y-axis guide member 52a extends, whereby it is possible to drain the oil OL smoothly. Further, since the liquid drainage mechanism 10 is configured to discharge the oil OL to the drainage Y-axis guide member 52a for guiding the Y-axis slider 54, it is not necessary to separately provide a member for draining the oil OL, and hence it is possible to reduce the installation cost of the liquid drainage mechanism 10.

It should be noted that the present invention is not limited to the above-described embodiment, and it goes without saying that various modifications can be made without departing from the gist of the present invention. For example, the member for discharging the oil OL from the C-axis rotary mechanism 70 is not limited to the nozzle 80 having the nozzle flow passage 86 therein, but various members (tubes, gutters, rods, etc.) capable of flowing oil OL can be adopted. For example, an unillustrated gutter may be provided. In this case, one end of the gutter is positioned below the outflow hole 84 of the stator 72, and the gutter is arranged to extend toward the drainage Y-axis guide member 52a. Further, the other end of the gutter is provided with an outlet through which the oil is discharged. This configuration can make the liquid drainage mechanism 10 more simple in structure, and installation costs can thus be reduced.

Figure 5:
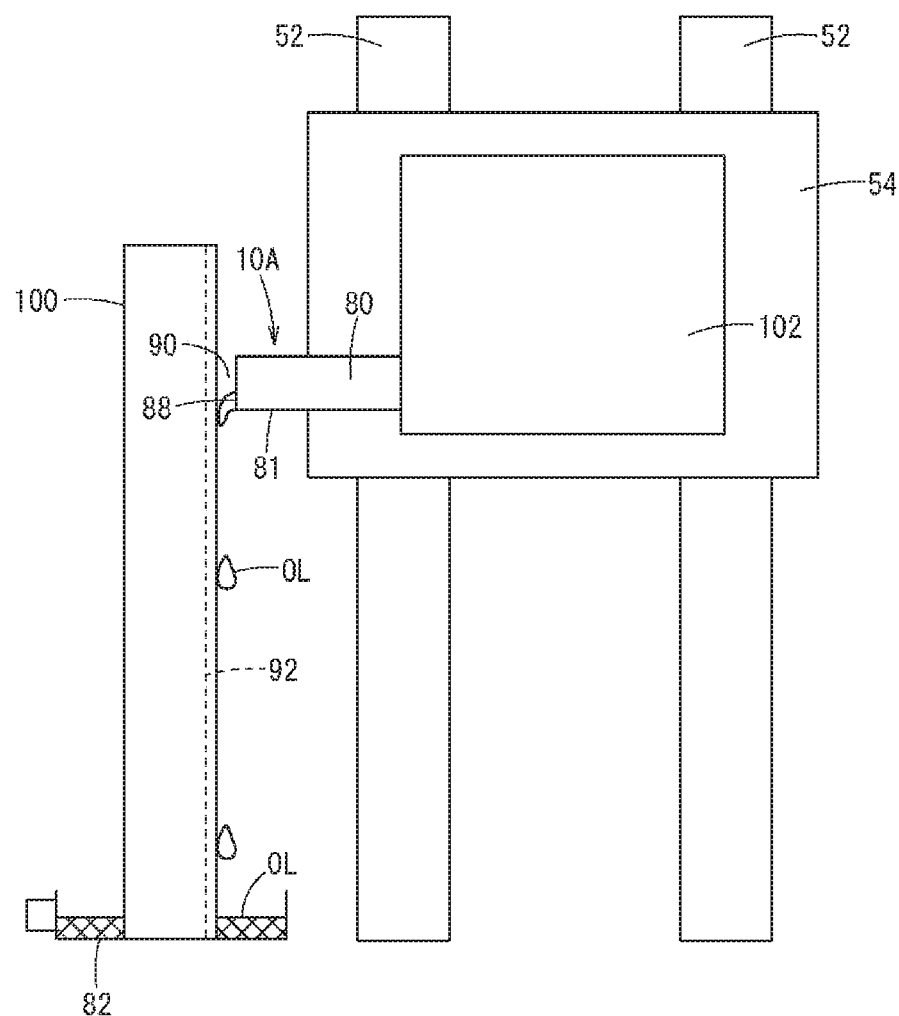

A liquid drainage mechanism 10A shown in FIG. 5 according to a modification example differs from the above-described liquid drainage mechanism 10 in that a drainage guide member 100 (fixed member) for allowing the oil OL ejected from a nozzle 80 to flow downward is provided separately from the Y-axis guide member 52. This liquid drainage mechanism 10A is configured to discharge the oil OL from a hydraulic device 102 that is provided in the Y-axis slider 54 of the machine tool 12. In short, the liquid drainage mechanism 10 or 10A according to the present invention can be applied not only to the particularly limited moving members but also applied to various structures that move along a predetermined path and need liquid drainage.

In this case, the drainage guide member 100 is disposed in the periphery of the Y-axis slider 54 and is installed so as to extend in parallel with the movement direction of the Y-axis slider 54. Further, the drainage guide member 100 is fixed such that a gap 90 is formed between the drainage guide member 100 and an extended end portion 81 of the nozzle 80 of the liquid drainage mechanism 10A (that is, the guide member is kept out of contact with the nozzle). Therefore, when the Y-axis slider 54 is moved, the distance d of the gap 90 between the nozzle 80 and the drainage guide member 100 is kept constant, and the oil OL flowing through the nozzle flow passage 86 in the nozzle 80 can be ejected and applied to the drainage guide member 100.

An oil pan 82 is provided at the bottom of the drainage guide member 100. The oil pan 82 stores the oil OL flowing down along the drainage guide member 100, and allows an oil collecting mechanism or the like to collect the oil. Here, the drainage guide member 100 may preferably have a flow groove 92 at a position facing the ejection port 88 of the nozzle 80 in the same manner as the liquid drainage mechanism 10.

As described above, the liquid drainage mechanism 10A and the machine tool 12 according to the modification example can also produce the same effect as the liquid drainage mechanism 10 according to the present embodiment. In particular, the drainage guide member 100 of the liquid drainage mechanism 10A can also cause the oil OL discharged from the nozzle 80 to flow through a desired path. Thus, for example, the drainage guide member 100 can be configured to directly guide the oil OL to the oil collecting mechanism, so as to promote reuse of the oil OL and other purposes.

What is claimed is:

1. A liquid drainage mechanism for draining liquid from a moving member that moves along a predetermined path, comprising:
   a flow passage provided in the moving member and configured to flow the liquid of the moving member;
   an ejector configured to move integrally with the moving member and eject the liquid flowing through the flow passage; and
   a fixed member provided on a side of the moving member so as to extend parallel to the predetermined path, wherein
   the ejector is disposed at a position that is close to but not in contact with the fixed member, the ejector being configured to discharge the liquid so that the liquid reaches the fixed member before the liquid drops on a surface located below the ejector,
   the moving member includes a rotary mechanism having a rotor and a stator configured to rotatably support the rotor, and
   the liquid is oil that is supplied between the rotor and the stator to thereby form a static pressure bearing.

2. The liquid drainage mechanism according to claim 1, wherein:
   the moving member is configured to reciprocate in vertical direction along the predetermined path, and
   a distance of a gap between the ejector and the fixed member is kept constant when the moving member is positioned at different heights.

3. The liquid drainage mechanism according to claim 1, wherein the flow passage is configured to communicate with a recessed portion formed under a housing space of the stator in which the rotor is accommodated, and the oil flows through the flow passage to the ejector.

4. The liquid drainage mechanism according to claim 1, wherein the fixed member has a groove facing an outlet of the ejector and extending in a direction in which the fixed member extends, the liquid being discharged from the ejector through the outlet.

5. The liquid drainage mechanism according to claim 1, wherein the fixed member is a guide member configured to guide movement of the moving member.

6. The liquid drainage mechanism according to claim 1, wherein the fixed member is a drainage guide member arranged in periphery of the moving member so as to extend in parallel with the predetermined path.

7. A machine tool, comprising:
   a moving member configured to move along a predetermined path; and
   a liquid drainage mechanism configured to drain liquid from the moving member, wherein:
   the liquid drainage mechanism includes:
      a flow passage provided in the moving member and configured to flow the liquid of the moving member;
      an ejector configured to move integrally with the moving member and eject the liquid flowing through the flow passage; and
      a fixed member provided on a side of the moving member so as to extend parallel to the predetermined path,
   the ejector is disposed at a position that is close to but not in contact with the fixed member, the ejector being configured to discharge the liquid so that the liquid reaches the fixed member before the liquid drops on a surface located below the ejector,
   the moving member includes a rotary mechanism having a rotor and a stator configured to rotatably support the rotor, and
   the liquid is oil that is supplied between the rotor and the stator to thereby form a static pressure bearing.

* * * * *